Figure 1:
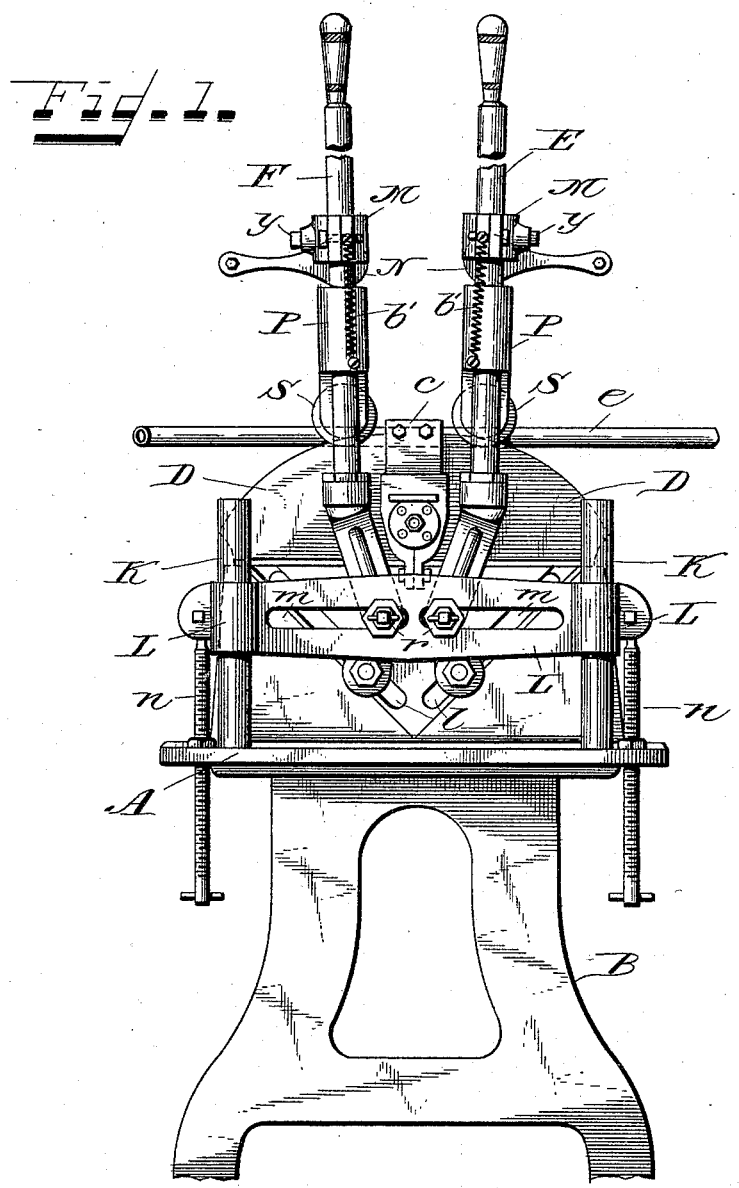

(No Model.) 4 Sheets—Sheet 1.

G. SCHACHT.
MACHINE FOR BENDING BICYCLE HANDLE BARS.

No. 537,550. Patented Apr. 16, 1895.

Witnesses.
J. Thomson Cross
Harvey Gates Edwards

Inventor:
Gustave Schacht
by Stem & Allen
Attorneys.

(No Model.) 4 Sheets—Sheet 2.
G. SCHACHT.
MACHINE FOR BENDING BICYCLE HANDLE BARS.
No. 537,550. Patented Apr. 16, 1895.
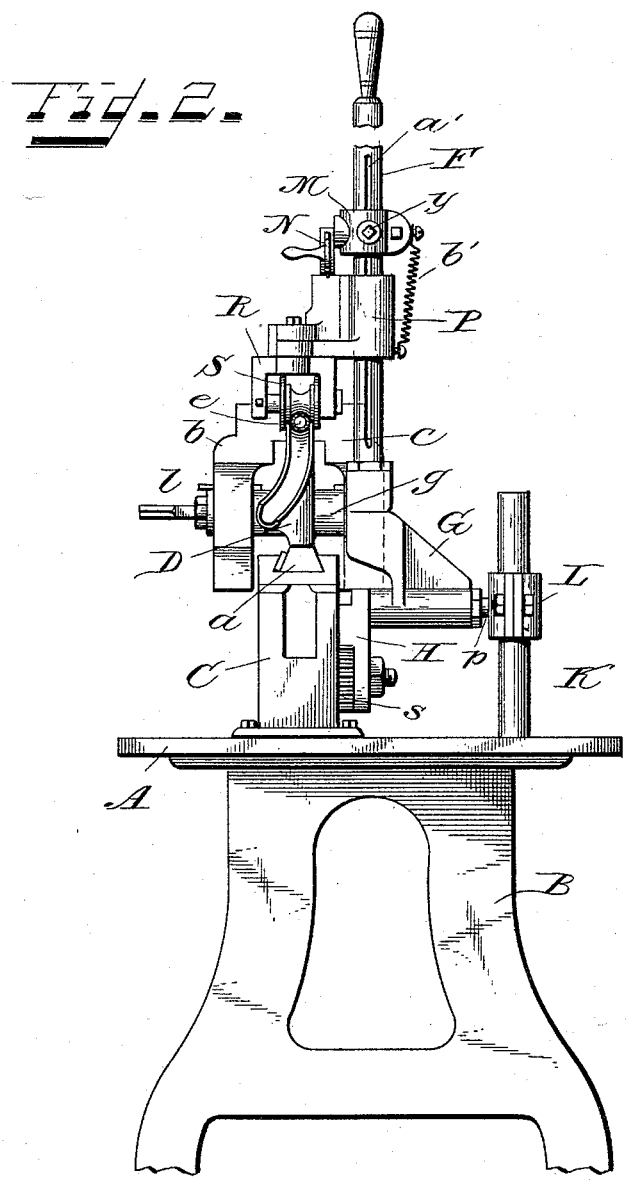

(No Model.) 4 Sheets—Sheet 3.
G. SCHACHT.
MACHINE FOR BENDING BICYCLE HANDLE BARS.
No. 537,550. Patented Apr. 16, 1895.
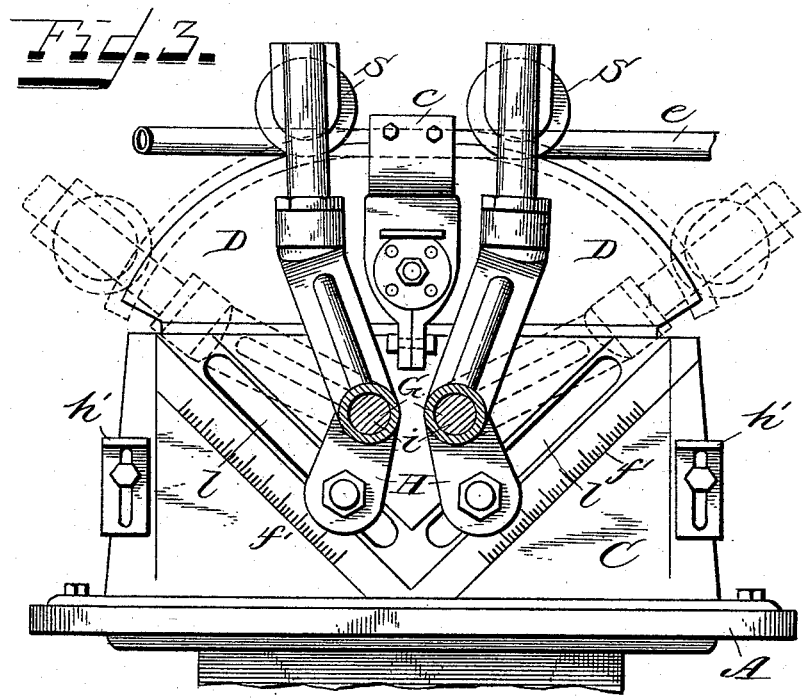
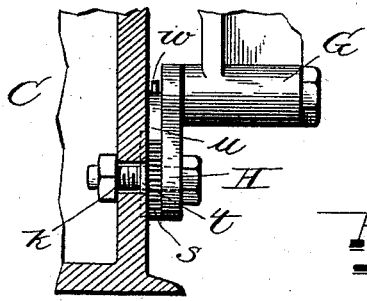
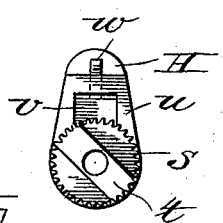
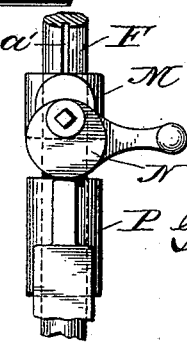
Witnesses.
J Thomson Cross
Harvey Gates Edwards
Inventor:
P. Gustave Schacht
by Stem & Allen
Attorneys.
THE NORRIS PETERS CO., PHOTO-LITHO., WASHINGTON, D. C.

(No Model.) 4 Sheets—Sheet 4.
G. SCHACHT.
MACHINE FOR BENDING BICYCLE HANDLE BARS.
No. 537,550. Patented Apr. 16, 1895.
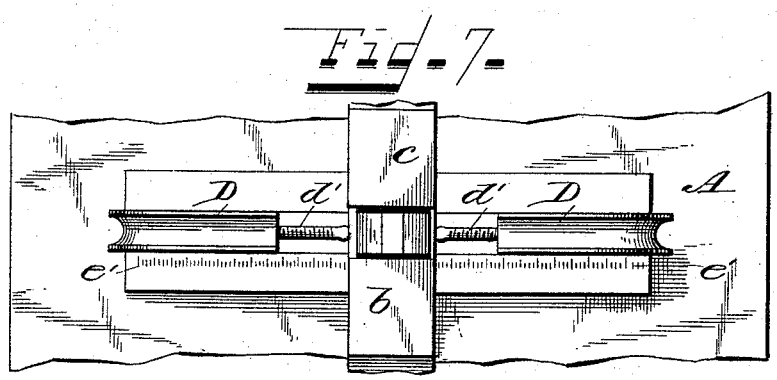
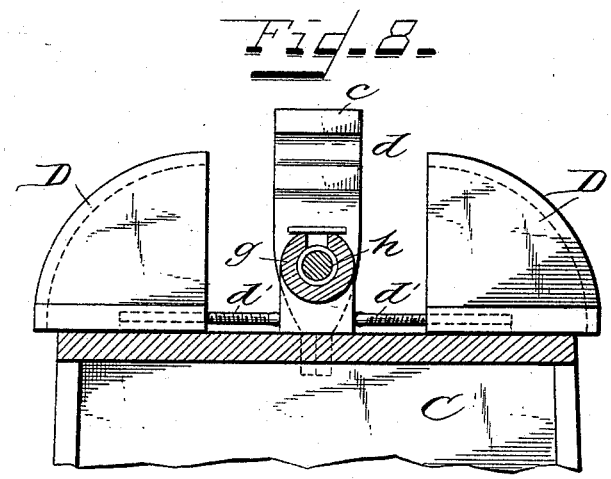
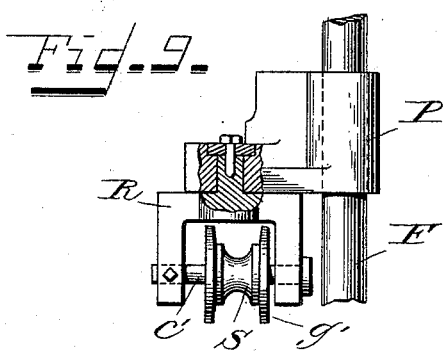
Witnesses.
J. Thomson Cross
Harvey Gates Edwards
Inventor:
Gustav Schacht
by Stem & Allen
Attorneys.

United States Patent Office.

GUSTAVE SCHACHT, OF CINCINNATI, OHIO.

MACHINE FOR BENDING BICYCLE HANDLE-BARS.

SPECIFICATION forming part of Letters Patent No. 537,550, dated April 16, 1895.

Application filed February 11, 1895. Serial No. 537,943. (No model.)

*To all whom it may concern:*

Be it known that I, GUSTAVE SCHACHT, a citizen of the United States, residing at Cincinnati, in the county of Hamilton and State of Ohio, have invented certain new and useful Improvements in Machines for Bending Bicycle Handle-Bars, of which the following is a full, clear, and exact description, reference being had to the accompanying drawings, forming part of this specification.

My improvements relate to machinery for giving the necessary and proper bends to handle bars for bicycles, in which similar and symmetrical bends are desired at each end of the handle bar, and it consists of certain novel constructions and arrangements of parts, to be hereinafter more particularly pointed out and claimed, whereby the bars may be bent while cold, without filling with lead or sand and whereby the machinery may be easily and accurately adjusted for making bends of any desired degree of curvature.

Heretofore in bending bicycle handle bars, which are usually hollow steel tubes it has been customary first to fill the tube with lead or sand, then to heat and bend the bar by hand. This heating of the bar naturally weakens the structure and in addition to this the filling of the tube has to be removed. It is to avoid these objections, that my improvements are more particularly directed.

In the drawings:—Figure 1 is a front elevation of the machine. Fig. 2 is a side elevation of the same. Fig. 3 is an enlarged front view of the lower portion of the machine with the fulcrum brace removed. Fig. 4 is a side view in detail of the adjusting arm of one of the operating levers. Fig. 5 is a front view of the ratchet and pawl of this adjusting arm. Fig. 6 is an enlarged view of the cam locking mechanism of one of the bending rollers. Fig. 7 is a top plan view of the bending blocks. Fig. 8 is a side view of same. Fig. 9 is an enlarged detail view partly in section of one of the bending rollers.

The bending machinery is securely fastened upon a suitable bed or table A, supported by standards B, B. Securely bolted to this table is a block C, the upper surface of which is provided with a longitudinally beveled groove within which a pair of bending blocks D, D, slide, the base of these blocks being dovetailed at $a$, to slide in this groove. At the central portion of the block C, is rigidly secured a vise consisting of jaws $b$, $c$, the jaws of the vise being formed with a longitudinal groove $d$, to receive and hold firmly the handle bar $e$, which is to be operated upon by the machine. The two jaws of this vise slide on the shaft or bar $g$ and are adjusted by a right and left screw $h$.

E, F, are the operating levers, one for the bend on each side of the handle bar. The lower ends of these levers are formed with collars or sleeves G, G, which are passed over and pivoted on pins $i$, $i$, extending out at right angles to the face of the short arms H, H. The lower ends of these arms H, H, are secured by the bolts $k$ (Fig. 4) in the inclined slots $l$, $l$, in the block C. Adjustable up and down on the posts K, K, is the slotted brace L provided with two horizontal slots $m$, $m$, one for each of the bending levers, this brace being adjusted by the screws $n$, $n$. The outer ends of the pins $i$, $i$, on the arms H, H, are formed with a circular recess into which the bolts $p$, $p$, take, which pass through the slots $m$, $m$, and which are adjustably secured in these slots by the nuts $r$, $r$. The pins $i$, $i$, are the pivotal centers for the operating levers E and F, and these centers are kept at a fixed point by means of the bolts $p$, $p$.

To prevent the arms H, H, from turning I provide the pawl and ratchet device shown in Figs. 4 and 5. Mounted on the bolt $k$, between the arm H and the block C, is a ratchet wheel $s$ provided with a projection or bar $t$, of a sufficient width to just fit within the slot $l$ so that the ratchet wheel cannot turn. The rear portion of the arm H, is formed with a casing $u$ within which slides a toothed pawl $v$, adjusted by the screw $w$. It will be manifest from this arrangement that the arm H, cannot turn until the pawl $v$, is withdrawn from engagement with the ratchet wheel $s$, by operating the screw $w$.

Adjustable up and down on the operating levers E and F are the collars M, M, held at any desired position by the set screws $y$, $y$, which take into the vertical groove $a'$ on the levers, the collars also being provided with a key sliding in this groove to prevent their turning on the levers. Pivoted to these collars M are the cam levers N, which bear against the sleeves P, P. These sleeves P, P, slide up and down on the operating levers a key thereon sliding in the grooves $a'$, and they are secured to the collars M, M, by the springs $b'$. When the cam levers N, N, are in the position shown in the drawings, the sleeves P, P, are pressed down thereby against the elasticity of the springs $b'$, $b'$ and when these cam levers are thrown up the sleeves P, are brought up into contact with the collars M by these springs. Swiveled to each of these sleeves P, P, is a bracket R (Fig. 9), in the depending arms of which is pivoted the grooved wheel S, mounted loosely on the pin $c'$, the arms of the bracket being of such width as to allow some play of the roller on its pivot pin.

The machine is operated as follows: The straight handle bar is placed in the vise and held securely at its center. Bending blocks grooved as shown in Fig. 7 are provided of different degrees of curvature to suit the requirements. Handle bars for bicycles are bent on curves of any desired radius and the bends commenced at any desired distance from the center post and it is essential therefore that the machine shall be adjusted at once to form any of these curves. Handle bars are also curved in two directions vertically and also at an angle to the vertical plane and when it is desired to get both of these bends, the blocks are made with the second curve, as shown in Fig. 2. Grooved blocks therefor being provided of the desired curvature, the blocks are slid into the block C and adjusted by the screws $d'$ $d'$ at the desired position for the required bend. A scale $e'$ is formed on the top of the block C, to gage this adjustment. It is now necessary to find the centers of the circles of which the blocks D, D, are segments. To do this, I have provided scales $f'$ $f'$ along the inclined slots $l$, $l$, in the block C, and the scale is so graded that when the arms H, H, are in a certain position, the fulcrum of the operating levers will be at the centers of the circle of which the blocks D, D, are segments. In order to get this position, the nuts and bolts which pass through the slots $m$, $m$, in the brace L are loosened; the arms H, H, are fixed at the desired position as indicated by the scale; the brace L is raised or lowered as the case may be, and the nuts $r$, $r$, are then tightened at the position they come to in the slots $m$, $m$. Having thus found and fixed the center of the desired curve and the handle bar being fixed in the vise, the rollers S, S, are brought down over the handle bar by operating the cam levers N, N, so that the flanges $g'$ $g'$ of the rollers will embrace the sides of the bending blocks. Two operators then grasp the operating levers E, F, and pull them down until they strike the rests $h'$ $h'$ which are secured to the block C, thus bending the handle bar. To allow the rollers S, S, to follow the second curve in the blocks, the rollers are mounted loosely on their pivot pin $c'$ so that they can slide thereon and at the same time the brackets R, R, being swiveled to the sleeves P, P, allow the rollers to turn with the second curve.

To get the two curves at each end of the handle bar, I prefer to use two sets of blocks, one set with a straight curve, as shown in Fig. 7, to obtain the first bend, which being made, the bar is again placed in the machine with the curved ends horizontal and blocks of the shape shown in Fig. 2 are then placed in the machine and the second curve given.

As I have already said, to obtain other degrees of curvature, different sets of bending blocks are required, but it will be evident that the vertical height of these blocks must all be the same as the vise is fixed and cannot be adjusted. If these different sized blocks were all to be located at the same position on the scale $e'$, the different points for the fulcrum of the operating lever would manifestly lie in a vertical line; but inasmuch as the curvature of the handle bars is not to begin at an arbitrarily fixed point from the center post, but changes with the wishes of customers, it will be necessary to locate the different sets of bending blocks at different positions on the scale $e'$. The pivotal centers therefore for the operating levers cannot be found in any fixed line, but will vary as the position of the bending blocks and the curves of these blocks are changed; nor will the scale $f'$ enable the operator to fix with certainty, the exact fulcrum point of the operating lever, but the scales $e'$ and $f'$ taken together will always and absolutely fix the proper fulcrum points and my machine is so arranged with reference to these two scales, that for the various degrees of curvature, when the arm H is at one point on its scale and the block D at a certain fixed point on its scale, then the fulcrum $i$ of the operating lever will be at the center of the curve of the block D. It is by the conjoint use therefore of the two scales $e'$ and $f'$, that I am enabled at a moment and without any calculation whatever to determine and fix the proper fulcrum point for any curve desired within the limits of the machine; and of course the limits of the machine depend on its size and the length of the slots $l$ and $m$, a matter merely of construction.

Having thus described my invention, what I claim, and desire to secure by Letters Patent, is—

1. In a machine for bending handle bars, the combination, with an operating lever, and a segmental block horizontally adjustable, over which block said bar is bent, of a slotted vertically adjustable brace within the slot in which said lever is pivoted, substantially as shown and described.

2. In a machine for bending handle bars, the combination, with an operating lever and segmental block, of a slotted adjustable brace to which said lever is pivoted, and an arm pivoted to said lever at its fulcrum which arm is adjustably secured to the machine frame to gage the adjustment of the lever fulcrum to the different curves, substantially as shown and described.

3. In a machine for bending handle bars the combination, with an operating lever, an adjustable bending block and an adjustable slotted brace in which said lever is pivoted, of a gage arm pivoted to said lever at its fulcrum and adjustably secured in a slot in the frame, with scales for said bending block and gage arm whereby the proper adjustment of the lever fulcrum for different curves may be readily determined, substantially as shown and described.

4. In a machine for bending handle bars, the combination with an operating lever, of a gage arm pivoted to said lever at its fulcrum, with a slot in which said arm is adjustably secured and a pawl and a ratchet for controlling the movement of and locking said arm substantially as shown and described.

5. In a machine for bending handle bars, the combination with an operating lever, of a gage arm pivoted to said lever at its fulcrum, with a slot in the machine frame in which said arm is adjustably secured, a ratchet wheel intermediate said arm and frame with a plate secured thereto fitting within said slot, and a pawl on said arm engaged with said ratchet wheel, for controlling the movement of and locking said arm in a fixed position, substantially as shown and described.

6. In a machine for bending handle bars, the combination, with the frame, constructed to support curved bending blocks of different degrees of curvature, of an operating lever adjustably pivoted thereto and a curved bending block grooved to receive the handle bar, with a correspondingly grooved roller, mounted in a collar sliding on said lever and adjustably secured thereto whereby the roller may be adjusted to travel on said block, substantially as shown and described.

GUSTAVE SCHACHT.

Witnesses:
GEORGE HEIDMAN,
HARVEY GATES EDWARDS.